US008842310B2

(12) United States Patent
Tredoux et al.

(10) Patent No.: US 8,842,310 B2
(45) Date of Patent: Sep. 23, 2014

(54) METHOD AND SYSTEM FOR ESTABLISHING SECURE COMMUNICATIONS BETWEEN A MULTIFUNCTION DEVICE AND A MOBILE COMMUNICATIONS DEVICE

(71) Applicant: Xerox Corporation, Norwalk, CT (US)

(72) Inventors: Gavan Tredoux, Penfield, NY (US); Phillip Emmett, Rochester, NY (US); Premkumar Rajendran, Pondicherry (IN); Peter Zehler, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 39 days.

(21) Appl. No.: 13/764,980

(22) Filed: Feb. 12, 2013

(65) Prior Publication Data

US 2014/0226173 A1    Aug. 14, 2014

(51) Int. Cl.
*G06F 3/12* (2006.01)
*G06K 15/00* (2006.01)
*H04L 12/46* (2006.01)
*H04L 29/06* (2006.01)
*G06F 21/55* (2013.01)
*G06F 21/60* (2013.01)
*H04L 12/26* (2006.01)

(52) U.S. Cl.
CPC ......... *G06K 15/4095* (2013.01); *H04L 12/4641* (2013.01); *H04L 63/20* (2013.01); *G06F 21/55* (2013.01); *G06F 3/1228* (2013.01); *G06F 21/608* (2013.01); *G06F 3/1222* (2013.01); *H04L 43/0811* (2013.01); *H04L 29/06* (2013.01); *G06F 3/1238* (2013.01); *H04L 63/083* (2013.01); *H04L 63/0272* (2013.01)
USPC ......... 358/1.14; 358/1.15; 358/1.1; 455/41.3; 455/41.1; 726/7; 726/3; 726/22; 726/4

(58) Field of Classification Search
None
See application file for complete search history.

(56) References Cited

U.S. PATENT DOCUMENTS

| | | | |
|---|---|---|---|
| 6,922,258 B2 | 7/2005 | Pineau | |
| 6,996,628 B2 * | 2/2006 | Keane et al. | 709/238 |
| 7,028,334 B2 * | 4/2006 | Tuomenoksa | 726/3 |
| 7,047,424 B2 * | 5/2006 | Bendinelli et al. | 726/22 |
| 7,193,734 B2 | 3/2007 | Silverbrook et al. | |
| 7,899,950 B2 | 3/2011 | Lorenzo et al. | |
| 8,553,266 B2 * | 10/2013 | Chiba et al. | 358/1.15 |
| 2004/0192210 A1 | 9/2004 | Park | |
| 2004/0250129 A1 * | 12/2004 | Clough et al. | 713/201 |
| 2004/0252333 A1 | 12/2004 | Blume et al. | |
| 2005/0083883 A1 * | 4/2005 | Ho et al. | 370/331 |
| 2008/0040777 A1 * | 2/2008 | Aihara et al. | 726/4 |
| 2008/0084579 A1 * | 4/2008 | Ozawa et al. | 358/1.15 |

(Continued)

*Primary Examiner* — Satwant Singh
(74) *Attorney, Agent, or Firm* — Kermit D. Lopez; Luis M. Ortiz; Ortiz & Lopez, PLLC

(57) ABSTRACT

A method and system for establishing secure communication between a MFD (Multi-Function Device) and a mobile communications device. A virtual private network (VPN) connection can be established between the mobile communications device and the MFD via a rendezvous server utilizing a random displayed code on a user interface of the MFD. An application with respect to the mobile communications device can be started by the user to connect to the MFD and the displayed code can be read by the mobile communications device utilizing an image capturing unit associated with the mobile communications device. The connection key presented by the mobile application can be validated by the rendezvous server. The rendezvous server can be polled for an incoming traffic and the traffic can be forwarded to a service hosted by the MFD utilizing an application running on the MFD.

20 Claims, 7 Drawing Sheets

(56) References Cited

U.S. PATENT DOCUMENTS

| | | |
|---|---|---|
| 2009/0011708 A1 | 1/2009 | Kim et al. |
| 2009/0064300 A1* | 3/2009 | Bagepalli et al. .................. 726/7 |
| 2010/0182630 A1* | 7/2010 | Jethani et al. ................ 358/1.15 |
| 2012/0008161 A1 | 1/2012 | Rouhana |
| 2012/0033248 A1 | 2/2012 | Farrell |
| 2012/0140261 A1 | 6/2012 | DeRoller |
| 2012/0243029 A1 | 9/2012 | St. Jacques, Jr. et al. |
| 2013/0258384 A1* | 10/2013 | Kanoh ......................... 358/1.13 |
| 2014/0094117 A1* | 4/2014 | Rajendran et al. ........... 455/41.1 |

* cited by examiner

METHOD AND SYSTEM FOR ESTABLISHING SECURE COMMUNICATIONS BETWEEN A MULTIFUNCTION DEVICE AND A MOBILE COMMUNICATIONS DEVICE

FIELD OF THE INVENTION

Embodiments are generally related to multi-function devices such as printers, scanners, photocopy machines, and the like. Embodiments are also related to mobile communications devices. Embodiments are additionally related to virtual private networks. Embodiments are further related to the establishment of secure communications between a multi-function device and a mobile communications device.

BACKGROUND

A MFD (Multi-Function Device) is a rendering device or office machine, which incorporates the functionality of multiple devices in one apparatus or system, so as to have a smaller footprint in a home or small business setting, or to provide centralized document management/distribution/production in the context of, for example, a large-office setting. A typical MFD may provide a combination of some or all of the following capabilities: printer, scanner, photocopier, fax machine, e-mail capability, and so forth. Networked MFDs (Multi-Function Devices) generally interact with an assemblage of varying rendering devices, client computers, servers, and other components that are connected to and communicate over a network.

A mobile communications device, for example, such as a Smartphone offers additional hardware such as sensors, storage, user data, and services. The MFD features can be controlled from the mobile communications device to perform composite operations. Conventionally, the devices are not directly connected on a shared network. For example, the MFD can be hosted on a private enterprise network and a user holding the mobile communications device can be connected to a public wireless network (e.g., 3G/4G). Also, the mobile communications device user is in transit, working in a temporary location and/or does not configure the mobile communications device with an appropriate security credential and other information required to connect to the enterprise network. Even if the two devices are nominally on the same network, many MFDs restrict access to certain functionality (such as the MFD scanner) so that it cannot be invoked from the enterprise network for security reasons.

A virtual private network (VPN) extends a private network and the resources contained in the network across public networks like the Internet. VPN enables a host computer to send and receive data across shared or public networks as if it were a private network with all the functionality, security, and management policies of the private network. Conventional approaches for establishing virtual private network between devices permit the devices to communicate privately over networks shared with other devices. Such approaches are hard to use in practice and require extensive pre-configuration of the devices and are unattractive to users, system administrators, and MFD manufacturers.

Based on the foregoing, it is believed that a need exists for an improved method and system for establishing secure communication between the MFD and the mobile communications device, as will be described in greater detail herein.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved method and system for managing a MFD (Multi-Function Device) such as a printer, scanner, photocopy machine, fax machine, etc., or a combination thereof.

It is another aspect of the disclosed embodiments to provide for an improved method and system for establishing secure communication between the MFD and a mobile communications device.

The aforementioned aspects and other objectives and advantages can now be achieved as described herein. A method and system for establishing secure communication between a MFD and a mobile communications device is disclosed herein. A VPN (Virtual Private Network) connection can be established between the mobile communications device and the MFD via a rendezvous server utilizing a random code (e.g., QR code/PIN number combination) displayed on a user interface of the MFD.

Note that such a code can be implemented as any code that is visually displayed and is not limited to the use of QR codes. Other codes include, for example, 1D stripe bar codes such UPC-A, Xerox Glyph Marks, 2D codes, and 3D codes such as Secure Seal, along with many others. It is important to appreciate, however, that such codes are not limited to visually-displayable codes, but may also be implemented in the context of dynamic codes through, for example, a NFC/RFID that requires contact or close physical proximity to read (e.g., through a Smarthpone's NFC reader), then this is equivalent to the "random code" discussed herein. If the mobile device can be physically inserted into a slot to read a value (e.g., a USB slot) or via a cable (e.g., retractable cable) this constitutes the same concept: exchanging the key via close physical proximity.

An application with respect to the mobile communications device can be initiated to connect to the MFD and the displayed code can be read by the mobile communications device utilizing an image capturing unit associated with the mobile communications device. The connection key presented by the mobile application can be validated by the rendezvous server. The rendezvous server can be polled for incoming traffic and the traffic can be forwarded to a service hosted by the MFD utilizing an application running on the MFD (e.g., EIP browser application). The connection can be expired after a period of inactivity and a physical proximity of the user can be established to prevent unwanted access to the MFD. Such an approach permits the mobile communications device and the MFD to communicate securely enabling control and extension of the MFD through the mobile communications device.

The rendezvous server is accessible to both the MFD and any device that requires the VPN connection to the MFD by running the application on the MFD. The random code includes a unique key that can be employed to establish the connection and other configuration information such as a network address of the rendezvous server. Alternatively, a human readable code (e.g., PIN number) can be read from the user interface of the MFD by the user and typed in manually. The application can also read the network address (e.g., URL) of the rendezvous server from the displayed code. The rendezvous server checks that the connection key presented by the mobile application is valid utilizing a standard cryptographic technique. If the key is valid, a network session can be established between the mobile communications device and the MFD.

A network request from the mobile communications device can be forwarded via the rendezvous server to the MFD and receive responses back from the MFD, and vice versa. The rendezvous server can redirect the mobile communications device to utilize an allied rendezvous server which is close to the mobile communication to establish greater efficiency. The code can also be displayed on the mobile communications device. The mobile communications device can also be paired with multiple MFDs to enable clustering of the MFDs by pairing the mobile communications device with each MFD in the cluster. The cluster can be formed on demand by the user holding the mobile communications device and the mobile communications device can perform load balancing of a rendering job over the formed cluster by a printing agent. The system grants secure and controlled access to the MFD services which may not be available to directly connected network devices, as well as enabling access to disconnected devices.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The disclosed embodiments are described in part below with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 1:
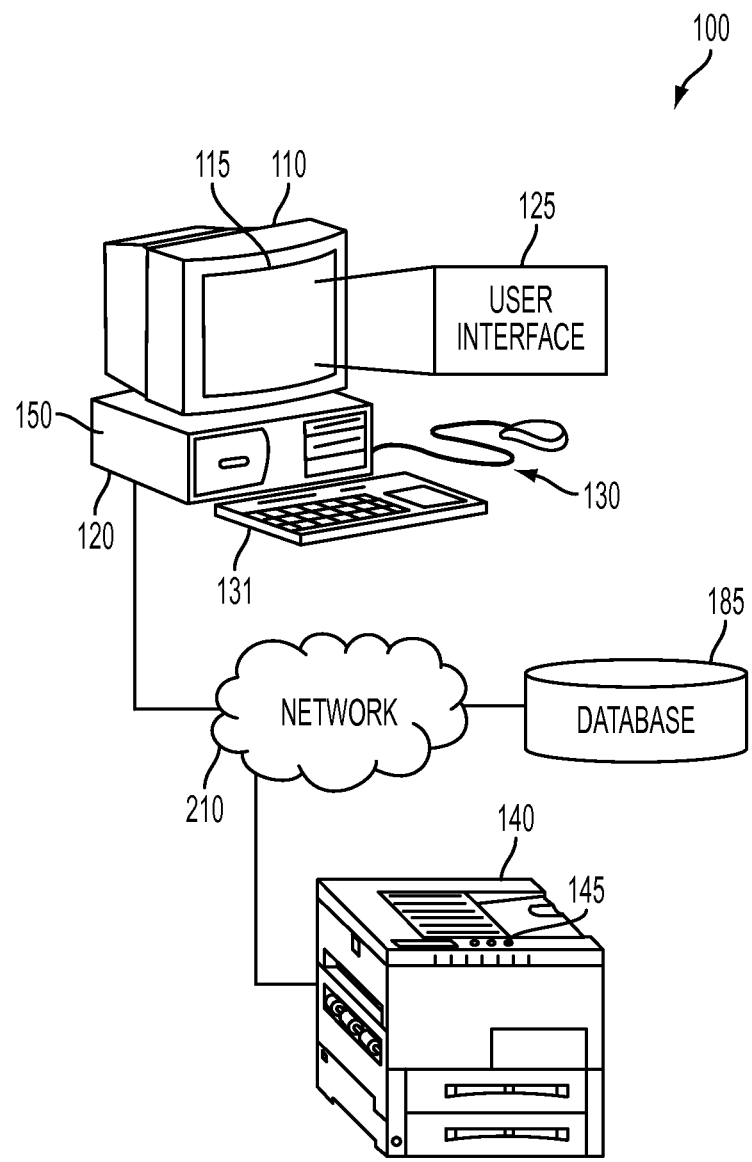
FIG. 1 illustrates an example of a multi-function device coupled to a data-processing apparatus through a network, in accordance with the disclosed embodiments.

Referring to FIG. 1, system 100 can be configured to include one or more networked devices, such as networked device 140, coupled to a data-processing apparatus 110 through a network 210. In some embodiments, networked device 140 may be a rendering device such as a printer, scanner, copy machine, etc. In other embodiments, networked device 140 may be a MFD, a file server, and/or a print server. The data-processing apparatus 110 may be, for example, a personal computer or other computing device, and generally includes a central processor 120, a display device 115, a keyboard 131, and a pointing device 130 (e.g., mouse, track ball, pen device, or the like).

Note that as utilized herein, the term networked device may refer to an apparatus or system such as a printer, scanner, fax machine, copy machine, etc., and/or a combination thereof (e.g., a MFD). Preferably, networked device 140 is a MFD capable of multiple rendering functions such as printing, copying, scanning, faxing, etc. In some embodiments, the MFD 140 may be implemented with a single rendering function such as printing. In other embodiments, the MFD 140 can be configured to provide multiple rendering functions such as scanning, faxing, printing, and copying.

The data-processing apparatus 110 can be coupled to the MFD 140 (and/or other MFDs and rendering devices) through computer network 210. Network 210 may employ any network topology, transmission medium, or network protocol. The network 210 may include connections such as wire, wireless communication links, or fiber optic cables. In the depicted example, network 210 is the Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages.

The networked MFD 140 includes a user interface 145 such as a panel menu. The panel menu may be used to select features and enter other data in the device 140. Such interfaces may include, for example, touch screens having touch activated keys for navigating through an option menu or the like. A driver program, for example, can be installed on the data-processing apparatus 110 and can reside on the host device's hard drive 150. The driver program may be activated through an application interface so that a user may generate a rendering job with the driver for processing by the MFD 140.

The data-processing apparatus 110 also includes a GUI 125 for communicating rendering features for processing, for example, the rendering job to a user and accepting the user's selection of available rendering features. The user interface 125 displays information and receives data through device display and/or the keyboard/mouse combination. The interface 125 also serves to display results, whereupon the user may supply additional inputs or terminate a given session. The data-processing apparatus 110 can be, for example, any computing device capable of being integrated within a network such as a PDA, personal computer, cellular telephone, point-of-sale terminal, server, etc.

The input device of the networked device 140, for example, may be a local user interface 145 such as a touch-screen display or separate keypad and display or a memory fob or the like as discussed above. Alternatively or additionally, the input device may be a wireless port that receives a wireless signal containing constraint data from a portable device. The wireless signal may be an infrared or electromagnetic signal. A system administrator may input constraint data through the local user interlace by manipulating the touch screen, keypad, or communicating via wireless messages through the wireless port. The administrator's portable device that communicates wirelessly may be a personal digital assistant (PDA), or the like, as noted above.

The following description is presented with respect to embodiments of the disclosed embodiments, which can be embodied in the context of the data-processing apparatus 110 and the networked device 140 depicted in FIG. 1. The disclosed embodiments, however, are not limited to any particular application or any particular environment. Instead, those skilled in the art will find that the system and methods of the disclosed embodiments may be advantageously applied to a variety of system and application software including database management systems, word processors, and the like. Moreover, the present invention may be embodied on a variety of different platforms including Macintosh, UNIX, LINUX, and the like. Therefore, the description of the exemplary embodiments, which follows, is for purposes of illustration and not considered a limitation.

Figure 2:
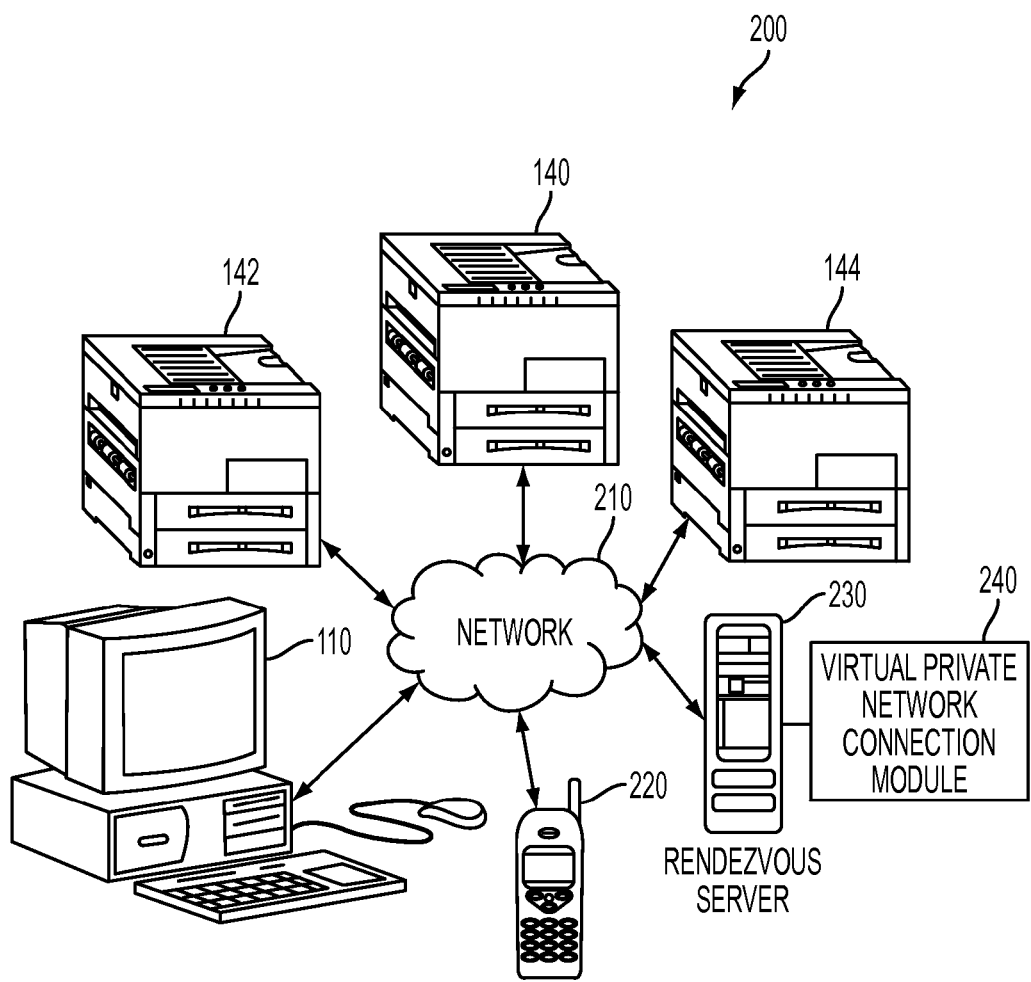
FIG. 2 illustrates a graphical representation of a device management system having a virtual private network connection module associated with a network, in accordance with the disclosed embodiments.

FIG. 2 illustrates a graphical representation of a device management system 200 having a virtual private network connection module 240 associated with a network 210, in accordance with the disclosed embodiments. The device management system 200 can include a network infrastructure 210 associated with one or more networked MFD's 140, 142, and 144, data-processing apparatus 110, a mobile communications device 220 (e.g., a Smartphone, a tablet computing device, a laptop computer, etc.) and an EIP server 230. Note that although the data-processing apparatus 110 is shown in FIG. 1 as a desktop or PC (Personal Computer), it can be appreciated that the data-processing apparatus can be implemented as other computing devices or systems such as, for example, a server. Additional devices such as desktop computers, network devices, cellular telephones, mobile computing devices, and so forth may also be included in the context of network 210 as, for example, service providers or other applications. The MFDs 140, 142, and 144 can be located remotely or locally with respect to each other, depending on network design configurations. For example, in some embodiments network 210 may be a local "intranet" or can in fact be the well-known Internet where the various devices 220, 230, 110, 142, 140, 144, and so on communicate via the Internet.

A typical MFD can act as a combination of a printer, scanner, photocopier, fax, e-mail, and so forth. While three MFD's 140, 142, and 144 are depicted in FIG. 2 by way of example, it is to be appreciated that any number of MFDs may be linked to the network 210 such as four, six or more rendering devices. In general, the MFDs 140, 142, and 144 can be employed to perform a rendering output function (e.g., printing, scanning, copying, faxing, etc.) within a networked environment. Note that MFDs 140, 142, and 144 are generally analogous to one another.

A virtual private network connection module 240 can be associated with the server 230 and can be adapted for establishing a secure communication between the MFDs 140, 142, and 144 and networked devices such as mobile communications device 220, server 230, data-processing apparatus 100, and so on. Note that as utilized herein, the term "module" may refer to a physical hardware component and/or to a software module. In the computer programming arts, such a software "module" may be implemented as a collection of routines and data structures that performs particular tasks or implements a particular abstract data type. Modules of this type are generally composed of two parts. First, a software module may list the constants, data types, variable, routines, and so forth that can be accessed by other modules or routines, Second, a software module may be configured as an implementation, which can be private (i.e., accessible only to the module), and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media, including transmission media and recordable media. The present invention is capable of being distributed as a program product in a variety of forms, which apply equally regardless of the particular type of signal-bearing media utilized to carry out the distribution.

Examples of signal-bearing media can include, for example, recordable-type media such as USB drives, flash disks, hard disk drives, DVDs, CD ROMs, CD-Rs, etc., and transmission media such as digital and/or analog communication links. Examples of transmission media can also include devices such as modems, which permit information to be transmitted over standard telephone lines and/or more advanced digital communications lines.

Figure 3:
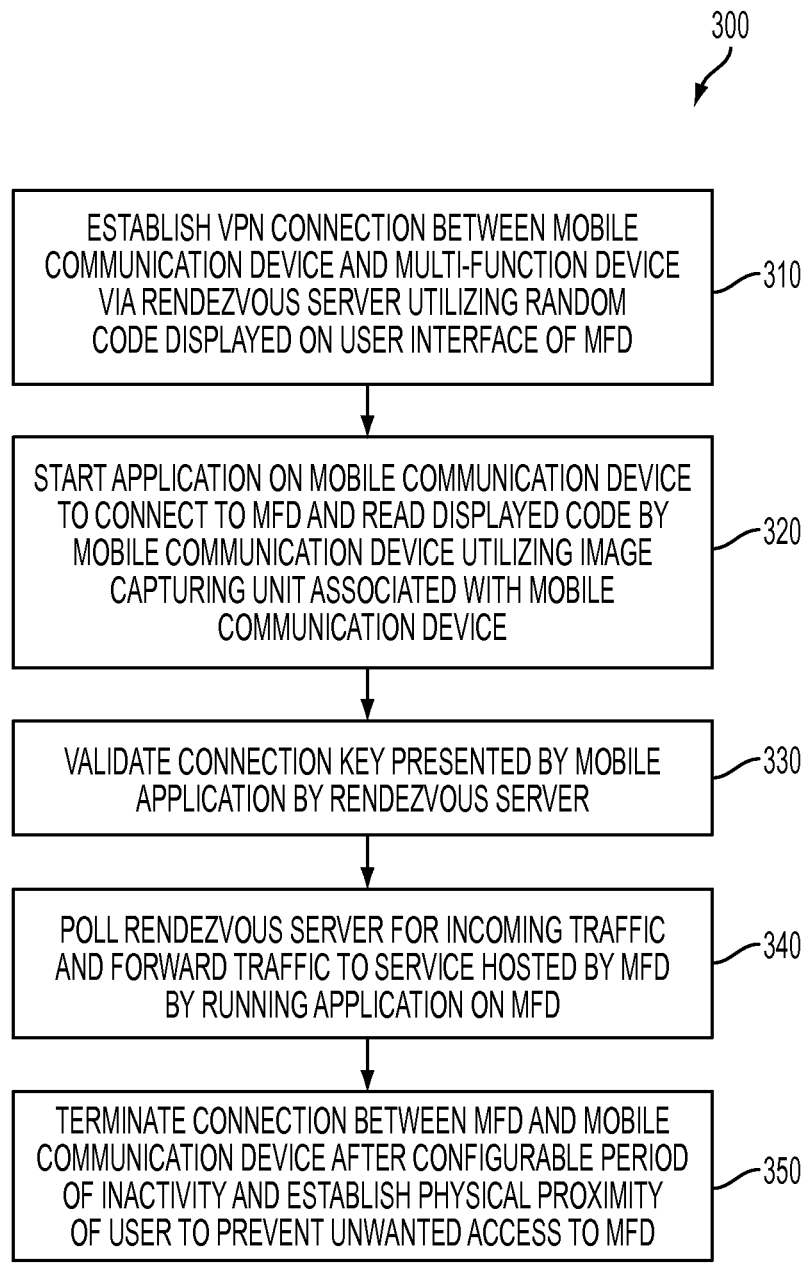
FIG. 3 illustrates a high level flow chart of operations illustrating logical operational steps of a method for establishing secure communication between the multifunction device and a mobile communications device, in accordance with the disclosed embodiments.

FIG. 3 illustrates a high level flow chart of operations illustrating logical operational steps of a method 300 for establishing secure communication between the MFD 140 and the mobile communications device 220, in accordance with the disclosed embodiments. Note that in FIGS. 1-8, identical or similar blocks are generally indicated by identical reference numerals. Initially, as indicated at block 310, a virtual private network connection (VPN) can be established between the mobile communications device 220 and the multi-function device via a rendezvous server 230 utilizing a random code 370 displayed on the user interface 145 of the MFD 140 (or other MFD's). Note that the random code 370 can be, for example, a QR code/PIN number combination, depending upon design consideration. "QR Code" (abbreviated from "Quick Response Code") is a type of matrix barcode or two-dimensional code. Such a code generally includes black components (e.g., square dots) arranged in a square or generally rectangular pattern on a white background. The information encoded can be configured from, for example, standardized types ("modes") of data (e.g., numeric, alphanumeric, byte/binary, Kanji, etc.), or through supported extensions, virtually any kind of data. Note that as utilized herein, the terms "QR Code" or "random code" can refer to any visually displayable and readable code (e.g., 1-d barcode, 2-d barcode or even video-based codes, which have multiple frames) or non-visually displayable codes. That is, such random codes are not limited to visually-displayable codes, but may also be implemented in the context of dynamic codes through, for example, a NFC/RFID that requires contact or close physical proximity to read (e.g., through a Smarthpone's NFC reader), then this is equivalent to the "random code" discussed herein. If the mobile device can be physically inserted into a slot to read a value (e.g., a USB slot) or via a cable (e.g., retractable cable) this constitutes the same concept: exchanging the key via close physical proximity.

Figure 4:
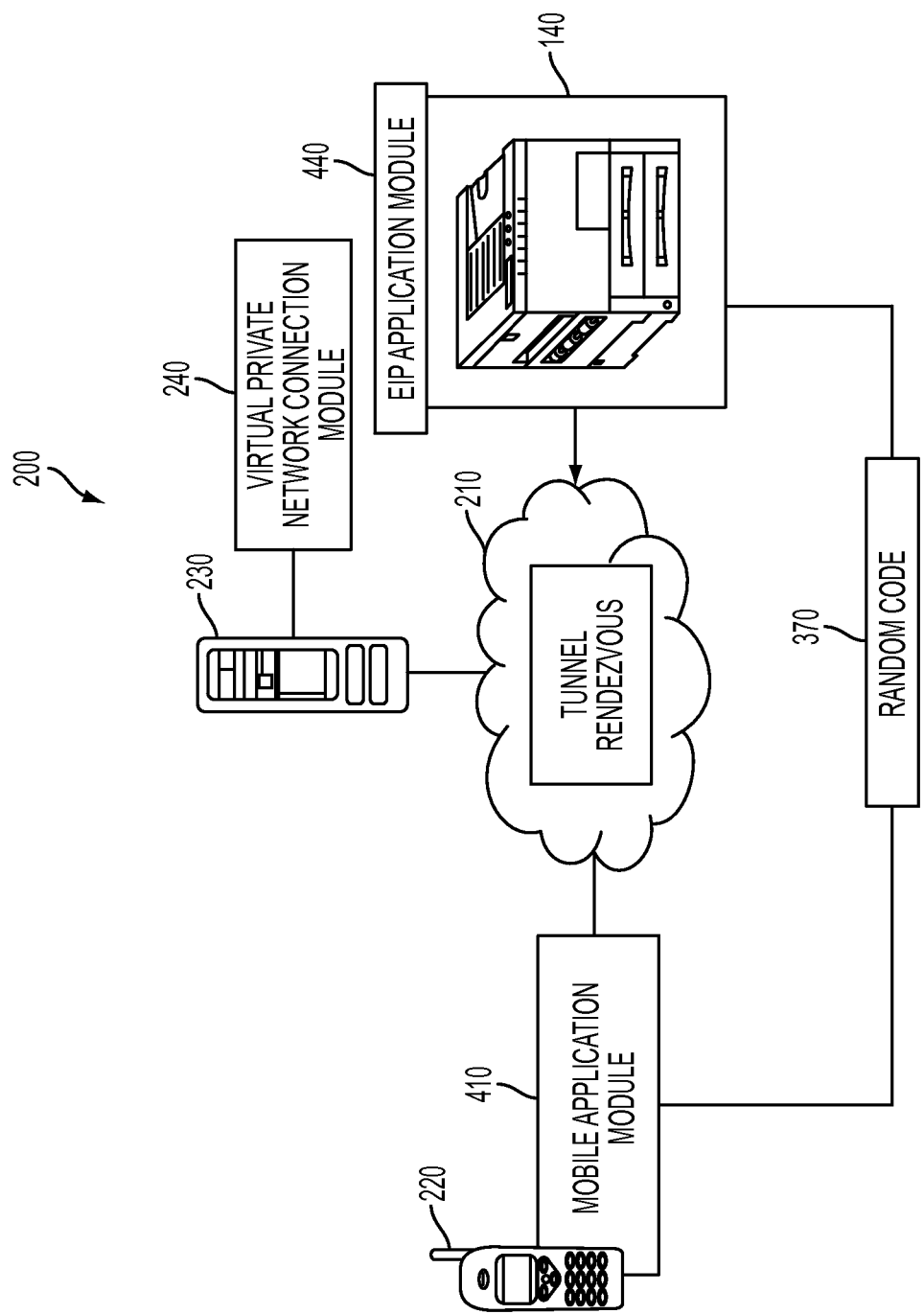
FIG. 4 illustrates a block diagram of the device management system having the multi-function device connected to the mobile communications device via a rendezvous server, in accordance with the disclosed embodiments.

As indicated next at block 320, an application with respect to the mobile communications device 220 can be initiated (by the user or non-user/automatically) to connect to a MFD (e.g., MFD 140) and the code 370 depicted in FIG. 4 can be read by the mobile communications device 220 utilizing an image capturing unit associated with the mobile communications device 220. Thereafter, as illustrated at block 330, a connection key can presented by the mobile application 310 and can be validated by, for example, the server 230 shown in FIG. 2. Note that in such an operation, the server 320 can function as a rendezvous server.

Thereafter, as described at block 340, the server 230 can be polled for incoming traffic and such traffic can be forwarded to a service hosted by the MFD 140 device utilizing an application (e.g., EIN application 440 shown in FIG. 4) running on the MFD 140 (e.g., EIP browser application). The connection can be expired after a period of inactivity and a physical proximity of the user can be established to prevent unwanted access to the MFD 140, as illustrated at block 350. Such an approach permits the mobile communications device 220 and the MFD 140 to communicate securely, enabling control and extension of the MFD 140 through the mobile communications device 220.

FIG. 4 illustrates a block diagram of the device management system 200 having the MFD 140 connected to the mobile communications device 220 via the rendezvous server 230, in accordance with the disclosed embodiments. FIG. 4 illustrates a configuration that can be employed to establish a VPN connection between the MFD 140 (and/or other MFD's) and the mobile communications device 220 via the rendezvous server 230. For example, the mobile communications device 220 may operate and communicate wirelessly in the context of a cellular 3G/4G wireless network and/or other network types (e.g., IEEE 802.11x etc.), and the MFD 140 may be associated with an enterprise network, where both devices 220 and 140 can reach and communicate with the designated rendezvous server 230.

The mobile communications device 220 can include a mobile application module 410 and the MFD 140 can include or communicate with an EIP application module 440. The server 230 can be accessible to both the MFD 140 and any device that wishes to make the VPN connection to the MFD 140. For example, the rendezvous server 230 can communicate with the Internet, but any other location accessible to both the MFD 140 and the mobile communications device 220 can be employed (e.g., some server 230 on an enterprise network that both can reach).

The EIP application module 440 with respect to the MFD 140 can connect to and communicate with the rendezvous server 230 and obtain the code 370 generated by the rendezvous server 230, and displays it via, for example, the user interface 145 of the MFD 140. The code 370 can contain a unique key that can be utilized to establish a connection and other configuration information such as the network address of the rendezvous server 230. Note that other browser applications can be employed to connect the mobile communications device 220 and the MFD 140 via the rendezvous server 230.

The application 410 can run via the mobile communications device 220, which is capable of reading the code 370 displayed on the MFD 140 screen, utilizing an image capturing unit (e.g., a camera/QR reader, etc.) associated with the mobile communications device 220. The application 410 can employ the extracted key to connect to the rendezvous server 230 and establish a VPN connection to the MFD 140. Alternatively, a human readable code (PIN number) can be read from the display by the user and typed in manually. The application 410 can also read the network address (e.g., URL) of the rendezvous server 230 from the displayed code 370 (or this may be pre-configured in the mobile application settings, depending upon design considerations).

The rendezvous server 230 checks that the connection key presented by the mobile application 310 is valid. This can be accomplished by making the key very hard to guess, utilizing standard cryptographic techniques. If the key is valid, a network session can be established between the mobile communications device 220 and the MFD 140 (or multiple MFD's). In an alternative embodiment, the rendezvous server 230 may require further authentication from the user such as a login, an additional PIN number, a personal security certificate, and/or biometric data (e.g., face recognition, fingerprint, characteristic walking gait, and/or any other information that can be gathered by a sensor associated with the mobile communications device 220). Note that multiple mobile communications devices can connect to multiple MFD's utilizing the code 370. This allows interactions like multiplexing of (say) scanned documents to each connected mobile participant, as at a trade fair or convention where this interaction is easier than exchanging email addresses and redistributing documents after the fact.

The application running on the MFD 140 polls the rendezvous server 230 for incoming traffic and forwards that traffic to the services hosted by the MFD 140. The mobile communications device 220 can make network requests that are forwarded through the rendezvous server 230 to the MFD 140 and receive responses back from the MFD 140, and vice versa. Note that the HTTP-transported network requests are illustrated for exemplary purposes, however, any network traffic can be forwarded in a similar manner to and from the MFD 140 and the mobile communications device 220. Connections can be made utilizing the HTTPS or similar secured protocol with certificates to provide trust between the MFD 140, rendezvous server 230, and mobile communications device 220 in order to secure the VPN, or more elaborate encryption methods may be used to analogous effect.

Additionally, if the rendezvous server 230 is aware of an allied rendezvous server which is dose to the mobile communications device 220 (e.g., in the same enterprise network), the rendezvous server 230 may redirect the mobile communications device 220 to use the closer allied rendezvous server 230. A network of cooperating rendezvous servers 230 can be employed to establish greater efficiency. After a configurable period of inactivity, the rendezvous server 230 expires the session between the MFD 140 and the mobile communications device 220.

The session key presented on the MFD 140 and obtained by the mobile communications device 220 is for one connection and further connections require restarting the connection process. This ensures that whenever the user wishes to make the VPN connection, the user has to be physically present at the device and obtain a new entry token. The consequence is that physical security of the device can be employed to augment the network security of the connection.

Figure 5:
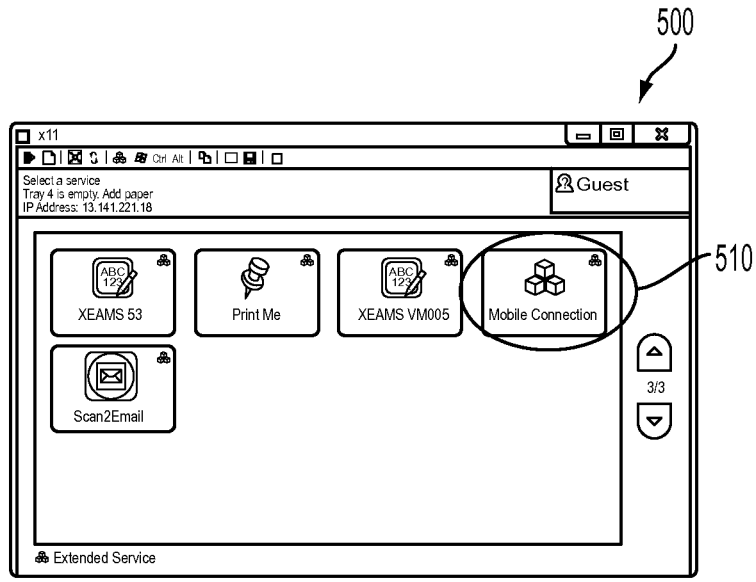
FIG. 5 illustrates a GUI of the multi-function device showing a mobile connection application, in accordance with the disclosed embodiments.
Figure 6:
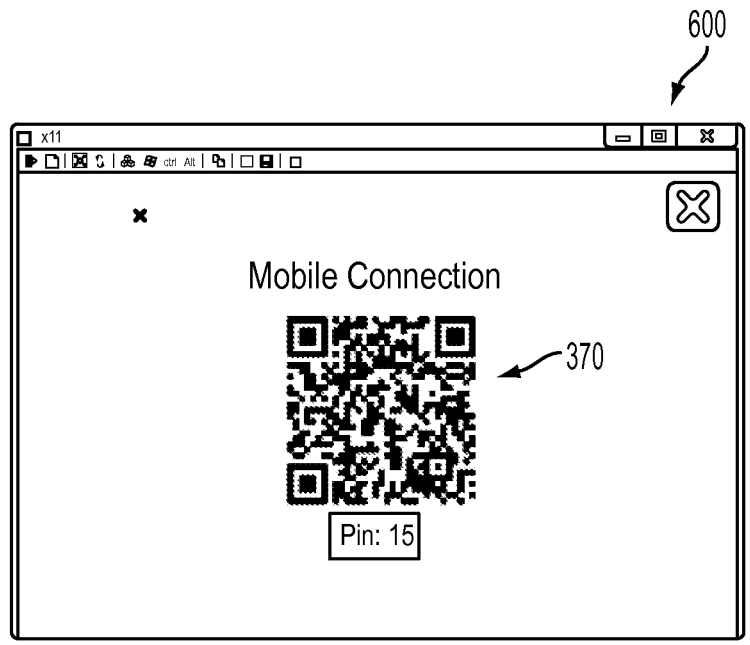
FIG. 6 illustrates a GUI of the multi-function device showing a random code, in accordance with the disclosed embodiments.

FIG. 5 illustrates a GUI 500 that can be implemented in the context of a MFD such as, for example, the MFD 140 and includes a graphically displayed icon 510 indicative of a mobile connection application such as application 410, in accordance with the disclosed embodiments. FIG. 6 illustrates a GUI 600 of the MFD 140 showing the random code 370, in accordance with the disclosed embodiments. FIGS. 5-6 illustrate the VPN connection setup process utilizing the QR codes 370 and the EIP application 440. Note also that the QR code can also be displayed on the MFD 140 and captured by the mobile communications device 220, depending upon design considerations. Also, the GUI of the mobile communications device 220 can also be employed to display (say) a PIN number which can then be typed in using the MFD 140 GUI.

Again, note that it is possible to pair the mobile communications device 220 with multiple MFD 140s, enabling scenarios such as clustering of printers by pairing the mobile communications device 220 with each device in the duster, depending upon design consideration. A duster can be formed "on demand" by the user holding the mobile communications device 220, and then a printing agent on the user's mobile communications device 220 can perform load balancing of a rendering job over the formed cluster. The ad-hoc dynamic duster formation has attractive usability properties since the user need not know the relevant network addresses of the devices involved, but can physically approach them to form the duster. Such a duster can be remembered and stored in settings.

Figure 7:
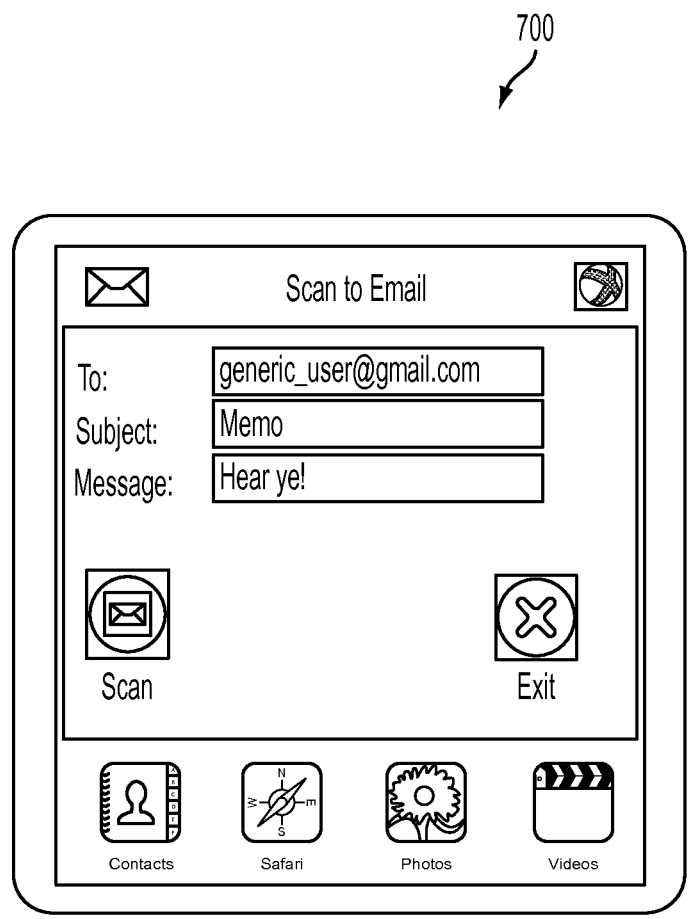
FIG. 7 illustrates a GUI of the mobile communications device showing a scan-to-email function, in accordance with the disclosed embodiments.

FIG. 7 illustrates a GUI 700 of the mobile communications device 220 showing a scan to email function, in accordance with the disclosed embodiments. The mobile communications device 220 can be configured to run the scan-to-email application, which remotely uses scan services on the MFD 140.

Figure 8:
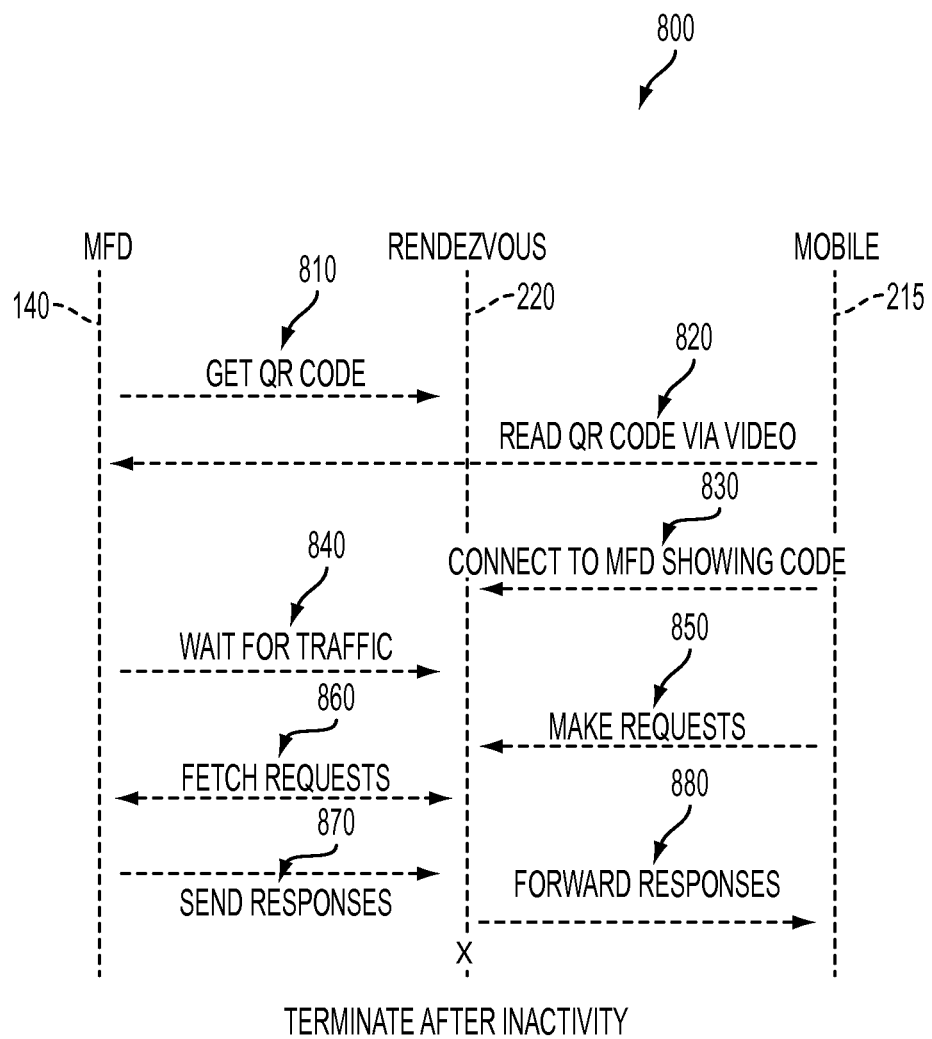
FIG. 8 illustrates an interaction diagram showing communication between the multi-function device, the rendezvous server, and the mobile communications device, in accordance with the disclosed embodiments.

FIG. 8 illustrates an interaction diagram 800 showing communication between the MFD 140, the rendezvous server 230, and the mobile communications device 220. The QR code 370 can be obtained from the MFD 140 and the code 370 can be read by the image capturing unit of the mobile communications device 220, as indicated by arrows 810 and 820. The mobile communications device 220 can be connected to the MFD 140 showing the code 370 and the MFD 140 polls the rendezvous server 230 for incoming traffic, as illustrated by arrows 830 and 840. The mobile communications device 220 makes the request and the MFD 140 fetches the request, as indicated by arrows 850 and 860. The MFD 140 transmits the response to the server 230 and the server 230 forwards the traffic to the mobile communications device 220, as shown by arrows 870 and 880. The connection can be expired after a period of inactivity and a physical proximity of the user can be established to prevent unwanted access to the MFD 140.

The system 200 permits the mobile communications device 220 and the MFD 140 to communicate securely, enabling control and extension of the MFD 140 through the mobile communications device 220. The system 200 achieves high levels of usability with security assurances which can be adequate for many real-world scenarios and greatly simplifies the creation of a secure VPN connection, while using existing hardware.

Based on the foregoing, it can be appreciated that a number of embodiments, preferred and alternative, are disclosed. For example, in one embodiment a method can be implemented for establishing secure communications between a multi-function device and a mobile communications device. Such a method may include the steps or logical operations of establishing a virtual private network connection between a mobile communications device and a multi-function device via a rendezvous server with respect to a random code displayable via the multi-function device; initiating an application to connect the mobile communications device to the multi-function device and thereafter read the random code by the mobile communications device utilizing an image capturing unit associated with the mobile communications device; and validating a connection key presented by the application via the rendezvous server to thereafter poll the rendezvous server for incoming traffic and forward the traffic to a service hosted by the multi-function device utilizing an application running on the multi-function device.

In another embodiments, steps or logical operations can be provided for terminating the connection after a period of inactivity; and establishing a physical proximity of the user to prevent unwanted access to the multi-function device in order to permit the mobile communications device and the multi-function device to communicate securely enabling control and extension of the multi-function device via the mobile communications device. In another embodiment, the random code can be implemented as a unique key to establish a connection and a network address of the rendezvous server.

In still another embodiment, steps or logical operations can be provided for determining if the connection key is valid utilizing a cryptographic technique provided by the rendezvous server; and establishing a network session between the mobile communications device and the multi-function device if the connection key is valid. In yet another embodiment, steps or logical operations can be implemented for forwarding a network request from the mobile communications device via the rendezvous server to the multi-function device and receiving a response back from the multi-function device and vice versa; and redirecting the mobile communications device to utilize an allied rendezvous server, which is close to the mobile communication to establish greater efficiency.

In other embodiments, steps or logical operations can be provided for pairing the mobile communications device with a plurality of multi-function devices to enable clustering based on demand by the user holding the mobile communications device and performing load balancing of a rendering job over the cluster by a printing agent.

In some embodiments, the random code can be implemented as a visually and displayable code. In yet other embodiments, the random code can be at least one of: a 1-dimensional barcode, a two-dimensional barcode, a three-dimensional barcode; a video-based code; or a code exchangeable via close proximity thereof.

In another embodiment, a system for establishing secure communications between a multi-function device and a mobile communications device can be implemented. Such a system can include, for example, a processor; a data bus coupled to the processor; and a computer-usable medium embodying computer program code, the computer-usable medium being coupled to the data bus. Such computer program code can include instructions executable by the processor and configured for establishing a virtual private network connection between a mobile communications device and a multi-function device via a rendezvous server with respect to a random code displayable via the multi-function device; initiating an application to connect the mobile communications device to the multi-function device and thereafter read the random code by the mobile communications device utilizing an image capturing unit associated with the mobile communications device; and validating a connection key presented by the application via the rendezvous server to thereafter poll the rendezvous server for incoming traffic and forward the traffic to a service hosted by the multi-function device utilizing an application running on the multi-function device.

In another embodiment, such instructions can be further configured for terminating the connection after a period of inactivity; and establishing a physical proximity of the user to prevent unwanted access to the multi-function device in order to permit the mobile communications device and the multi-function device to communicate securely enabling control and extension of the multi-function device via the mobile communications device. In still other embodiments, such instructions can be further configured for determining if the connection key is valid utilizing a cryptographic technique provided by the rendezvous server; and establishing a network session between the mobile communications device and the multi-function device if the connection key is valid.

In yet other embodiments, such instructions can be further configured for forwarding a network request from the mobile communications device via the rendezvous server to the multi-function device and receiving a response back from the multi-function device and vice versa; and redirecting the mobile communications device to utilize an allied rendezvous server, which is close to the mobile communication to establish greater efficiency. In another embodiment, such instructions can be further configured for pairing the mobile communications device with a plurality of multi-function devices to enable clustering based on demand by the user holding the mobile communications device; and performing load balancing of a rendering job over the cluster by a printing agent.

In yet another embodiment, a processor-readable medium storing computer code representing instructions to cause a process for establishing secure communications between a multi-function device and a mobile communications device can be implemented. Such computer code can include code to, for example, establish a virtual private network connection between a mobile communications device and a multi-function device via a rendezvous server with respect to a random code displayable via the multi-function device; initiate an application to connect the mobile communications device to the multi-function device and thereafter read the random code by the mobile communications device utilizing an image capturing unit associated with the mobile communications device; and validate a connection key presented by the application via the rendezvous server to thereafter poll the rendezvous server for incoming traffic and forward the traffic to a service hosted by the multi-function device utilizing an application running on the multi-function device.

In other embodiments, such computer code can further include code to terminate the connection after a period of inactivity; and establish a physical proximity of the user to prevent unwanted access to the multi-function device in order to permit the mobile communications device and the multi-function device to communicate securely enabling control and extension of the multi-function device via the mobile communications device. In yet another embodiment, such computer code can further include code to determine if the connection key is valid utilizing a cryptographic technique provided by the rendezvous server; and establish a network session between the mobile communications device and the multi-function device if the connection key is valid.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for establishing secure communications between a multi-function device and a mobile communications device, said method comprising:
    establishing a virtual private network connection between a mobile communications device and a multi-function device via a rendezvous server with respect to a random code displayable via said multi-function device;
    initiating an application to connect said mobile communications device to said multi-function device and thereafter read said random code by said mobile communications device utilizing an image capturing unit associated with said mobile communications device; and
    validating a connection key presented by said application via said rendezvous server to thereafter poll said rendezvous server for incoming traffic and forward said traffic to a service hosted by said multi-function device utilizing an application running on said multi-function device.

2. The method of claim 1 further comprising:
    terminating said connection after a period of inactivity; and
    establishing a physical proximity of said user to prevent unwanted access to said multi-function device in order to permit said mobile communications device and said multi-function device to communicate securely enabling control and extension of said multi-function device via said mobile communications device.

3. The method of claim 1 wherein said random code comprises a unique key to establish a connection and a network address of said rendezvous server.

4. The method of claim 1 further comprising:
    determining if said connection key is valid utilizing a cryptographic technique provided by said rendezvous server; and
    establishing a network session between said mobile communications device and said multi-function device if said connection key is valid.

5. The method of claim 1 further comprising:
    forwarding a network request from said mobile communications device via said rendezvous server to said multi-function device and receiving a response back from said multi-function device and vice versa; and redirecting said mobile communications device to utilize an allied rendezvous server, which is close to said mobile communication to establish greater efficiency.

6. The method of claim 1 further comprising:
pairing said mobile communications device with a plurality of multi-function devices to enable clustering based on demand by said user holding said mobile communications device; and
performing load balancing of a rendering job over said cluster by a printing agent.

7. The method of claim 1 wherein said random code comprises a visually and displayable code.

8. The method of claim 1 wherein said random code comprises at least one of: a 1-dimensional barcode, a two-dimensional barcode, a three-dimensional barcode; a video-based code; or a code exchangeable via close proximity thereof.

9. A system for establishing secure communications between a multi-function device and a mobile communications device, said system comprising:
a processor;
a data bus coupled to said processor; and
a computer-usable medium embodying computer program code, said computer-usable medium being coupled to said data bus, said computer program code comprising instructions executable by said processor and configured for:
establishing a virtual private network connection between a mobile communications device and a multi-function device via a rendezvous server with respect to a random code displayable via said multi-function device;
initiating an application to connect said mobile communications device to said multi-function device and thereafter read said random code by said mobile communications device utilizing an image capturing unit associated with said mobile communications device; and
validating a connection key presented by said application via said rendezvous server to thereafter poll said rendezvous server for incoming traffic and forward said traffic to a service hosted by said multi-function device utilizing an application running on said multi-function device.

10. The system of claim 9 wherein said instructions are further configured for;
terminating said connection after a period of inactivity; and
establishing a physical proximity of said user to prevent unwanted access to said multi-function device in order to permit said mobile communications device and said multi-function device to communicate securely enabling control and extension of said multi-function device via said mobile communications device.

11. The system of claim 9 wherein said random code comprises a unique key to establish a connection and a network address of said rendezvous server.

12. The system of claim 9 wherein said instructions are further configured for;
determining if said connection key is valid utilizing a cryptographic technique provided by said rendezvous server; and
establishing a network session between said mobile communications device and said multi-function device if said connection key is valid.

13. The system of claim 9 wherein said instructions are further configured for;
forwarding a network request from said mobile communications device via said rendezvous server to said multi-function device and receiving a response back from said multi-function device and vice versa; and
redirecting said mobile communications device to utilize an allied rendezvous server, which is close to said mobile communication to establish greater efficiency.

14. The system of claim 9 wherein said instructions are further configured for:
pairing said mobile communications device with a plurality of multi-function devices to enable clustering based on demand by said user holding said mobile communications device; and
performing load balancing of a rendering job over said duster by a printing agent.

15. The system of claim 9 wherein said random code comprises a visually and displayable code or a non-visually displayable code.

16. The system of claim 9 wherein said random code comprises at least one of; a 1-dimensional barcode, a two-dimensional barcode, a three-dimensional barcode; a video-based code; or a code exchangeable via dose proximity thereof.

17. A non-transitory processor-readable medium storing computer code representing instructions to cause a process for establishing secure communications between a multi-function device and a mobile communications device, said computer code comprising code to:
establish a virtual private network connection between a mobile communications device and a multi-function device via a rendezvous server with respect to a random code displayable via said multi-function device;
initiate an application to connect said mobile communications device to said multi-function device and thereafter read said random code by said mobile communications device utilizing an image capturing unit associated with said mobile communications device; and
validate a connection key presented by said application via said rendezvous server to thereafter poll said rendezvous server for incoming traffic and forward said traffic to a service hosted by said multi-function device utilizing an application running on said multi-function device.

18. The non-transitory processor-readable medium of claim 17 wherein said computer code further comprises code to:
terminate said connection after a period of inactivity; and
establish a physical proximity of said user to prevent unwanted access to said multi-function device in order to permit said mobile communications device and said multi-function device to communicate securely enabling control and extension of said multi-function device via said mobile communications device.

19. The non-transitory processor-readable medium of claim 18 wherein said random code comprises a unique key to establish a connection and a network address of said rendezvous server.

20. The non-transitory processor-readable medium of claim 18 wherein said computer code further comprises code to:
determine if said connection key is valid utilizing a cryptographic technique provided by said rendezvous server; and
establish a network session between said mobile communications device and said multi-function device if said connection key is valid.

* * * * *